W. W. MORROW & C. H. BURGETT.
GREASE CUP.
APPLICATION FILED JULY 1, 1916.
1,213,678.
Patented Jan. 23, 1917.
2 SHEETS—SHEET 1.
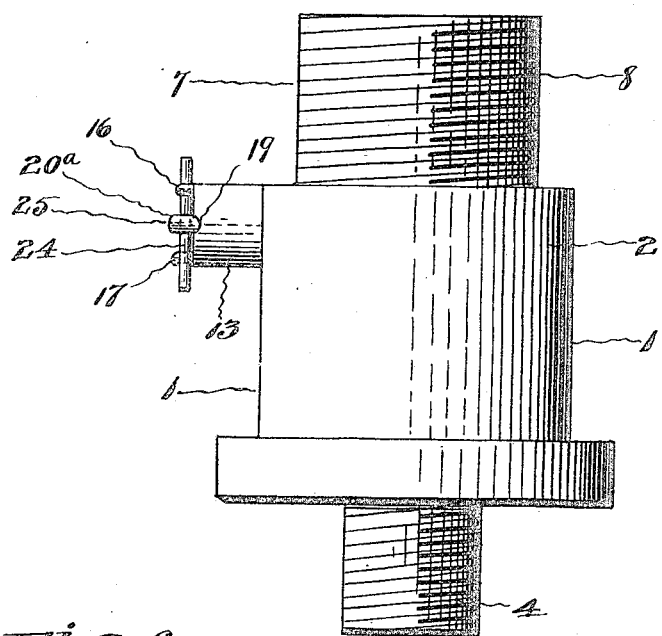
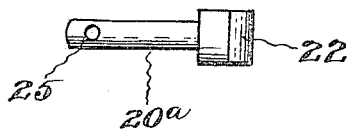
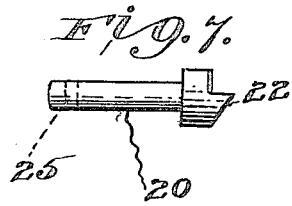
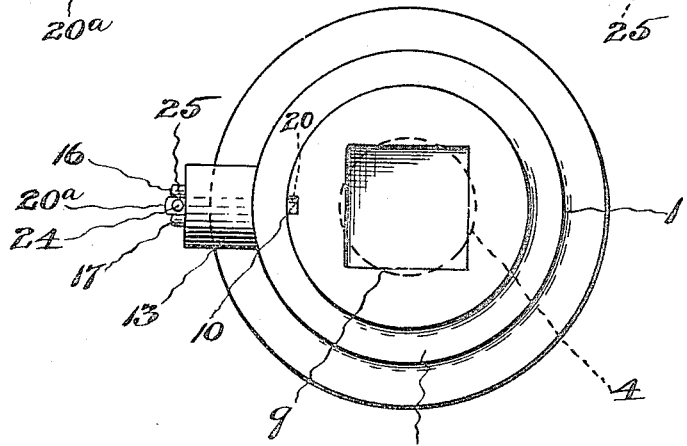
Inventors,
Wesley W. Morrow and Charles H. Burgett
By Blackwood Bros.,
Attorneys.

W. W. MORROW & C. H. BURGETT.
GREASE CUP.
APPLICATION FILED JULY 1, 1916.
1,213,678.
Patented Jan. 23, 1917.
2 SHEETS—SHEET 2.
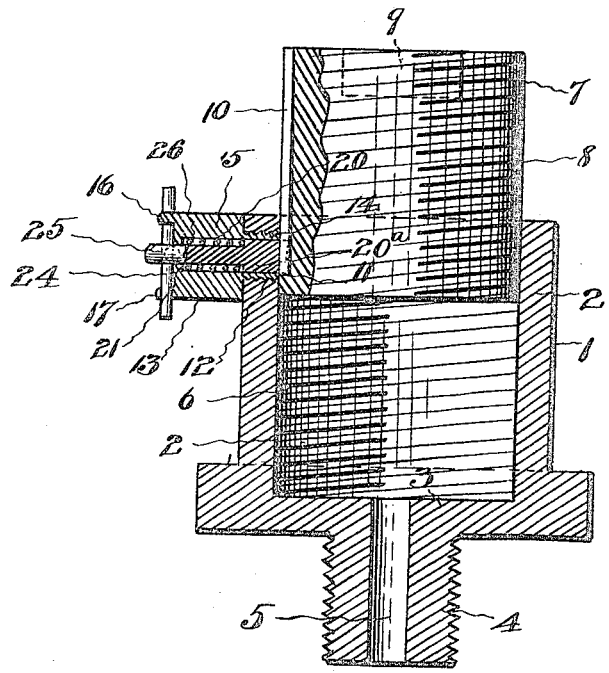
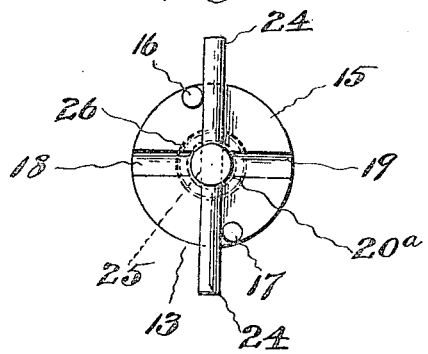
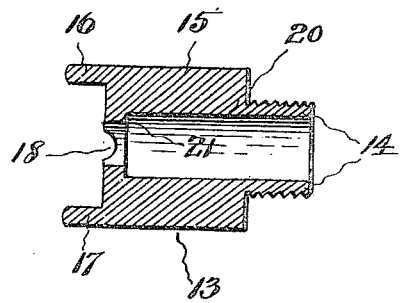
Inventors,
Wesley W. Morrow and Charles H. Burgett
By Blackwood Bros,
Attorneys

UNITED STATES PATENT OFFICE.

WESLEY W. MORROW AND CHARLES H. BURGETT, OF PRESCOTT, ARIZONA.

GREASE-CUP.

1,213,678.   Specification of Letters Patent.   Patented Jan. 23, 1917.

Application filed July 1, 1916. Serial No. 107,131.

*To all whom it may concern:*

Be it known that we, WESLEY W. MORROW and CHARLES H. BURGETT, both residing in Prescott, in the county of Yavapai and State of Arizona, and both being citizens of the United States, have invented jointly certain new and useful Improvements in Grease-Cups; and we do hereby declare the following to be a full, clear, and exact description of the invention, such as will enable others skilled in the art to which it appertains to make and use the same.

Our invention relates to improvements in grease cups for lubricating the bearings of machinery, and more especially for use on the connecting and parallel rods of locomotive engines.

The invention consists in the several features and in the construction, combination and arrangement of such features as hereinafter more fully described and claimed.

It has for its object to prevent the unscrewing, and consequent loss, of the grease ejecting plug of a grease cup.

It further has for its object to lock the grease ejecting plug of a grease cup against upward movement and at the same time admit of its being screwed downward freely to eject the grease from the grease cup.

It further has for its object to provide a grease cup which is simple, inexpensive and durable in construction and effective in use.

Referring to the drawings:—Figure 1 is a side view. Fig. 2 a top plan view. Fig. 3 a vertical central section partly in elevation. Fig. 4 an enlarged detail end view of the plug carrying the locking means for the grease ejecting plug. Fig. 5 a detail sectional view of the plug carrying the locking means for the grease ejecting plug. Fig. 6 an enlarged side view of the locking pawl on an enlarged scale. Fig. 7 an enlarged top plan view of the locking pawl on an enlarged scale.

In the drawings in which like reference characters denote like parts throughout the several views, 1 represents the grease cup, preferably shown as cylindrical in form but which may be made of any desired shape or size to suit the different requirements of use, which comprises a grease receptacle 2 with a bottom 3 provided with an exteriorly screwthreaded boss or depending projection 4 having a feed hole or channel 5 through which the grease passes and is adapted to be fed to the part of the locomotive or other machinery it is desired to lubricate.

The interior of the grease cup is provided with screwthreads 6 and a grease ejecting plug 7 is mounted therein having exterior screwthreads 8 which engage the interior screwthreads 6 of the grease cup, 9 being a rectangular socket adapted to receive a suitable wrench or other tool by which the grease ejecting plug may be manipulated and 10 is a vertically extending slot which terminates at a point 11 near the lower end of the plug.

The wall of the grease cup has a laterally extending screwthreaded opening 12 formed therethrough and 13 is a plug, carrying the locking mechanism for the grease ejecting plug, having a reduced inner portion 14 provided with exterior screwthreads which engage the screwthreads of the opening 12. The plug 13 comprises, as has been previously described, a reduced screwthreaded portion 14, a body portion 15 provided with lugs 16 and 17 projecting from the outer end thereof, laterally and radially extending slots 18 and 19 in its outer end, and a bore or chamber 20 having an annular shoulder 21. In the bore or chamber 20 a locking pawl 20$^a$ having a beveled end 22 is slidably mounted which is provided at its outer end with a handle or bar 24 secured in a hole 25 therein, and 26 is a spiral spring surrounding the locking pawl and which keeps the pawl under spring tension and admits of the pawl being forced outward and caused to ride on the screwthreads 8 of the grease ejecting plug when the plug is rotated to the right, or inward, to force grease out of the grease cup, but which keeps the pawl in engagement with and locked in the slot 10 and prevents the grease ejecting plug from being rotated to the left, or outward, thus making it impossible for the grease ejecting plug to become disengaged from the grease cup without withdrawing the pawl from the slot 10 of the grease ejecting plug.

The slots 18 and 19 are for the purpose of receiving the handle or rod 24 when the pawl is in engagement with the slot 10 of the grease ejecting plug and the lugs 16 and 17 are for the purpose of holding the handle or rod 24 when the pawl is withdrawn from the slot 10 so that the grease ejecting plug may be unscrewed and removed when it is desired to replenish the supply of grease in the grease cup.

In operation grease is placed in the grease receptacle 2, the locking pawl 20 is moved outward by pulling the handle or bar 24 outward and turning said handle until it abuts against lugs 16 and 17, the grease ejecting plug is then screwed into the grease receptacle, the desired distance, the handle 24 is turned in the reverse direction until it engages the radial slots 18 and 19 and the pawl engages the slot 10 of the grease ejecting plug, when by turning the grease ejecting plug to the right, by means of a suitable wrench or other tool, it causes the grease ejecting plug to exert pressure on the grease in the grease receptacle and causes the grease to be expelled or fed through the feed hole or channel 5 to the part to be lubricated. When it is desired to withdraw the grease ejecting plug from the grease receptacle it is only necessary to draw the locking pawl outward which will disengage it from the slot 10 of the grease ejecting plug when the plug can be removed by unscrewing the same.

We do not wish to be understood as limiting ourselves to the details of construction and arrangement as herein described and illustrated, as it is manifest that variations and modifications may be made in the features of construction and arrangement in the adaptation of the device to various conditions of use without departing from the spirit and scope of our invention and improvements. We therefore reserve the right to all such variations and modifications as properly fall within the scope of our invention and the terms of the following claims:—

What we claim is:—

1. In a grease cup, a grease receptacle, a plug secured in the wall of said grease receptacle and having a chamber or bore, a pawl mounted within said chamber having a rigid handle means on said plug for securing the handle in different radial positions and a grease ejecting plug adapted to be engaged by said pawl and held from rotary movement in one direction.

2. In a grease cup, a grease receptacle provided with a plug in its wall having a chamber or bore communicating with the interior of the grease receptacle, a pawl rotatably and slidably mounted in said chamber and provided with a handle and means on said plug for engaging the ends of said handle and retaining it in different positions.

3. In a grease cup, a grease receptacle provided with a hollow plug in its wall communicating with the interior of the grease receptacle, a rotatable and slidable spring pressed pawl mounted in said chamber having a handle with laterally projecting ends and means for retaining said handle in different radial positions on said plug.

4. In a grease cup, a grease receptacle having an opening in its wall, a plug secured in said opening provided with lugs and slots, a pawl having a handle, adapted to engage said lugs and slots a grease ejecting plug having a slot adapted to receive the end of the pawl by which said grease ejecting plug is held from rotary movement in one direction.

5. In a grease cup, a grease receptacle having an opening in its wall, a hollow plug secured in said opening having lugs and slots, a rotatable and slidable spring pressed pawl having a beveled end and mounted within said hollow plug and provided with a handle adapted to engage the said lugs and slots and a grease ejecting plug having a longitudinal slot with which the beveled end of the pawl is adapted to engage for the purpose of locking the grease ejecting plug.

6. In a grease cup, a grease receptacle provided with a grease ejecting plug having a slot, spring pressed rigid means passing through the wall of the grease receptacle and adapted to engage the slot in the grease ejecting plug and lock said plug from rotary movement in one direction, and means on the spring pressed means for securing said spring pressed means in different positions.

7. In a grease cup, a grease receptacle provided with interior screwthreads, a hole or channel for feeding grease to the part to be lubricated and a screwthreaded opening in its wall, and a hollow plug secured in said screwthreaded opening provided with a rotatable and slidable spring pressed pawl therein having a beveled inner end and its outer end provided with a rigid handle, means on the face of said hollow plug for retaining said spring pressed pawl in its inner and outer positions, and a grease ejecting plug having exterior screwthreads to engage the screwthreads of the grease receptacle and a longitudinal slot with which said pawl is adapted to engage for the purpose of locking the grease ejecting plug from rotary movement in one direction.

In testimony whereof we affix our signatures in the presence of two witnesses.

WESLEY W. MORROW.
CHARLES H. BURGETT.

Witnesses:
MARTIN GRATZ,
WILBERT E. SCOTT.